(12) United States Patent
Morie

(10) Patent No.: US 12,516,858 B2
(45) Date of Patent: Jan. 6, 2026

(54) CRYOCOOLER AND METHOD FOR OPERATING CRYOCOOLER

(71) Applicant: SUMITOMO HEAVY INDUSTRIES, LTD., Tokyo (JP)

(72) Inventor: Takaaki Morie, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 233 days.

(21) Appl. No.: 18/523,699

(22) Filed: Nov. 29, 2023

(65) Prior Publication Data

US 2024/0102705 A1  Mar. 28, 2024

Related U.S. Application Data

(63) Continuation of application No. PCT/JP2022/022183, filed on May 31, 2022.

(30) Foreign Application Priority Data

Jun. 10, 2021  (JP) ................. 2021-097197

(51) Int. Cl.
*F25B 41/20* (2021.01)
*F25B 49/02* (2006.01)

(52) U.S. Cl.
CPC .............. *F25B 41/20* (2021.01); *F25B 49/02* (2013.01); *F25B 2309/005* (2013.01); *F25B 2700/19* (2013.01)

(58) Field of Classification Search
CPC .......... F25B 2309/005; F25B 2309/006; F25B 2700/19; F25B 2700/1931;
(Continued)

(56) References Cited

U.S. PATENT DOCUMENTS 5,009,072 A * 4/1991 Nagao ................... F02G 1/0445
                                                              60/520
5,398,512 A    3/1995 Inaguchi et al.
(Continued)

FOREIGN PATENT DOCUMENTS

JP    H02-302563 A    12/1990
JP    H05-280468 A    10/1993
(Continued)

*Primary Examiner* — Filip Zec
(74) *Attorney, Agent, or Firm* — HEA Law PLLC

(57) ABSTRACT

A cryocooler includes an expander provided with an expander motor including a motor rotary shaft, a displacer that changes a volume of an expansion space of a working gas by reciprocating linearly by the motor rotation shaft rotating, and a rotary valve that controls intake and exhaust of the working gas into the expansion space by rotating by the motor rotation shaft rotating, a pressure sensor that measures a pressure of the working gas and outputs a measurement signal indicating the measured pressure, and a controller that receives the measurement signal, detects a feature point appearing periodically in the measured pressure during an operation of the cryocooler, acquires a motor drive waveform indicating a command rotation speed of the motor rotary shaft determined to vary within one rotation of the motor rotary shaft, and outputs the motor drive waveform in synchronization with the feature point appearing periodically.

12 Claims, 6 Drawing Sheets

(58) Field of Classification Search
CPC .. F25B 2700/1933; F25B 41/20; F25B 49/02; F25B 49/025; F25B 9/06; F25B 9/10; F25B 9/14

See application file for complete search history.

(56) References Cited

U.S. PATENT DOCUMENTS

| | | | |
|---|---|---|---|
| 7,555,911 B2 | 7/2009 | Tanaka | |
| 8,307,666 B2* | 11/2012 | Woidtke | F16J 15/02 |
| | | | 62/51.1 |
| 9,395,108 B2 | 7/2016 | Morie et al. | |
| 9,976,779 B2* | 5/2018 | Xu | F25B 9/14 |
| 10,753,653 B2* | 8/2020 | Longsworth | F28F 3/025 |
| 10,927,001 B2* | 2/2021 | Fiedler | B81B 7/0061 |
| 11,333,409 B2* | 5/2022 | Mizuno | F25B 9/145 |
| 2018/0083507 A1* | 3/2018 | Tokizaki | H02K 3/50 |

FOREIGN PATENT DOCUMENTS

| | | |
|---|---|---|
| JP | H06-101917 A | 4/1994 |
| JP | 2003-279182 A | 10/2003 |
| JP | 2004-003792 A | 1/2004 |
| JP | 2014-139498 A | 7/2014 |

\* cited by examiner

CRYOCOOLER AND METHOD FOR OPERATING CRYOCOOLER

CROSS-REFERENCE TO RELATED APPLICATIONS

This is a bypass continuation of International PCT Application No. PCT/JP2022/022183, filed on May 31, 2022, which claims priority to Japanese Patent Application No. 2021-097197, filed on Jun. 10, 2021, which are incorporated by reference herein in their entirety.

BACKGROUND

Technical Field

Certain embodiments of the present invention relate to a cryocooler and a method for operating a cryocooler.

Description of Related Art

The cryocooler includes, for example, a Gifford-McMahon (GM) cryocooler having a displacer that reciprocates in order to periodically change the volume of the expansion space of the working gas. A refrigeration cycle is configured in the cryocooler by changing the pressure in the expansion space appropriately in synchronization with the periodic volume fluctuation in the expansion space. As one of the typical methods for driving the reciprocation of the displacer, there is a type in which a drive source such as an electric motor is mechanically connected to the displacer and the displacer is reciprocated by the rotation output from the motor. One rotation of the motor corresponds to one reciprocation of the displacer, that is, one refrigeration cycle.

SUMMARY

According to an aspect of the present invention, a cryocooler includes: an expander provided with an expander motor having a motor rotary shaft, a displacer that is connected to the motor rotary shaft to reciprocate linearly by rotation of the motor rotary shaft so as to change a volume of an expansion space of a working gas by the reciprocation, and a rotary valve that is connected to the motor rotary shaft to be rotated by the rotation of the motor rotary shaft and controls intake and exhaust of the working gas into the expansion space; a pressure sensor that measures a pressure of the working gas and outputs a measurement signal indicating the measured pressure; and a controller configured to: receive the measurement signal; detect a feature point appearing periodically in the measured pressure during an operation of the cryocooler; acquire a motor drive waveform indicating a command rotation speed of the motor rotary shaft determined to vary within one rotation of the motor rotary shaft; and output the motor drive waveform in synchronization with the feature point appearing periodically.

According to an aspect of the present invention, there is provided a method for operating a cryocooler. The cryocooler includes an expander provided with an expander motor having a motor rotary shaft, a displacer that is connected to the motor rotary shaft to reciprocate linearly by rotation of the motor rotary shaft so as to change a volume of an expansion space of a working gas by the reciprocation, and a rotary valve that is connected to the motor rotary shaft to be rotated by the rotation of the motor rotary shaft and controls intake and exhaust of the working gas into the expansion space. The present method includes: measuring a pressure of the working gas; detecting a feature point that periodically appears in the measured pressure during the operation of the cryocooler; acquiring a motor drive waveform indicating a command rotation speed of the motor rotary shaft determined to vary within one rotation of the motor rotary shaft; and outputting the motor drive waveform in synchronization with the feature point appearing periodically.

According to an aspect of the present invention, an cryocooler includes: an expander motor having a motor rotary shaft; a displacer connected to the motor rotary shaft to reciprocate linearly by the rotation of the motor rotary shaft so as to change the volume of the expansion space of the working gas by the reciprocation such that the displacer passes through a top dead center where the volume of the expansion space is a maximum within a first angle range in one rotation of the motor rotary shaft and passes through a midpoint between the top dead center and a bottom dead center where the volume of the expansion space is a minimum within a second angle range following the first angle range in the one rotation of the motor rotary shaft; and a controller that operates the expander motor to reduce a rotation speed of the motor rotary shaft in the second angle range as compared to the first angle range.

Any combinations of the components described above or mutual replacement of the components or expressions of the present invention in methods, devices, systems, or the like are also effective as aspects of the present invention.

DETAILED DESCRIPTION

Figure 1:
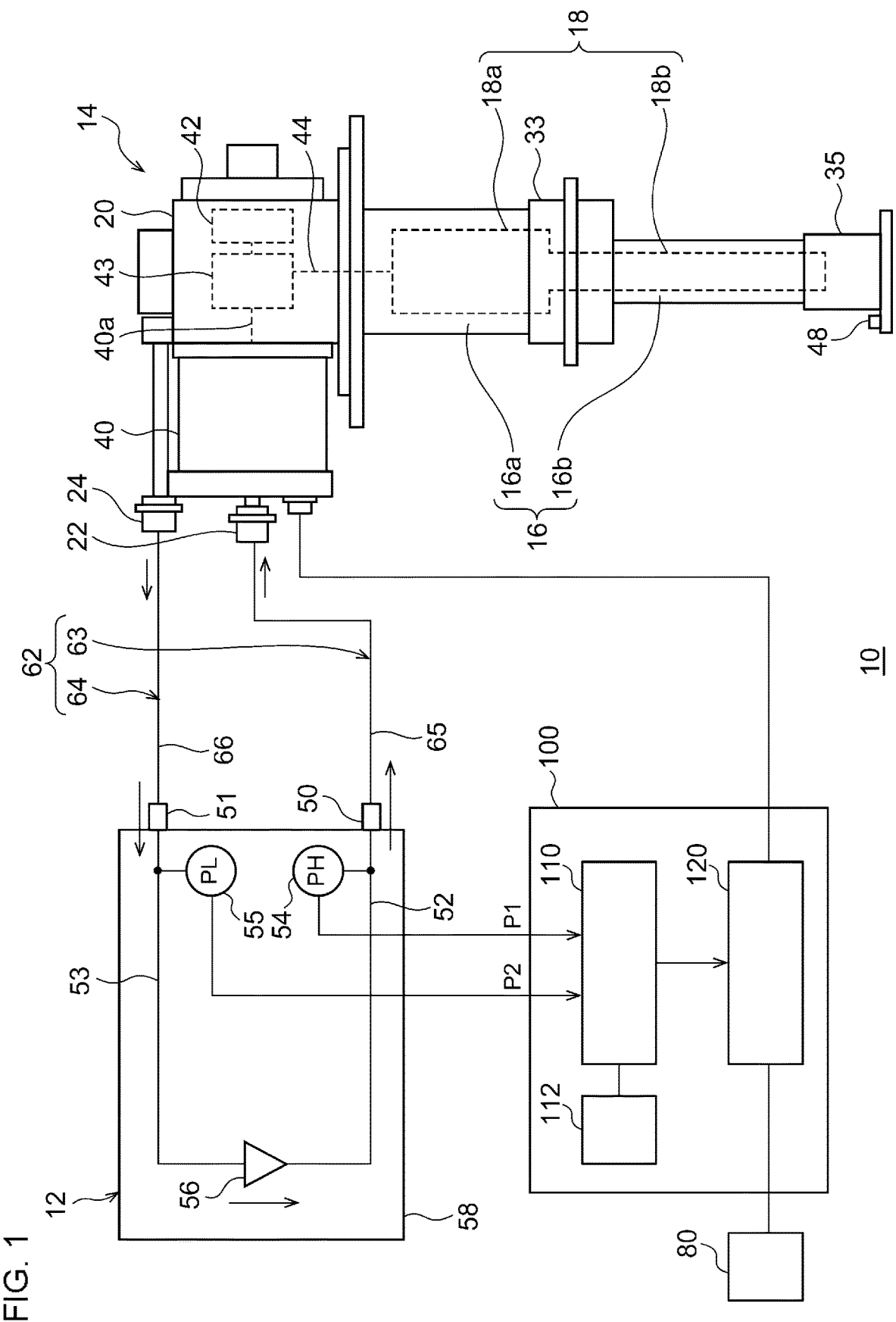
FIG. 1 is a diagram schematically showing a cryocooler according to an embodiment.

From the viewpoint of improving the cooling capacity of the cryocooler, an attempt is made to optimally control the movement speed of the displacer according to the position of the displacer, by changing the rotation speed of the motor for driving the displacer in one rotation. In order to implement this, typically, it is conceivable to adopt a method of detecting the position of the displacer, that is, the rotation position of the motor, and controlling the rotation speed of the motor and thus the movement speed of the displacer according to the detection position. However, this method requires the addition of a position detector to the motor. Such a position detector is relatively expensive and can result in an increase in the manufacturing cost of the cryocooler. In addition, an increase in size of the motor due to the addition of the position detector may be a problem.

In one aspect of the present invention, it is desirable to enable optimum operation of the cryocooler without detecting the position.

Hereinafter, embodiments for carrying out the present invention will be described in detail with reference to the drawings. In the description and drawings, identical or equivalent components, members, and processing are denoted by the same reference numerals, and overlapping description is omitted as appropriate. The scale or shape of each part that is shown in the drawings is conveniently set for ease of description and is not limitedly interpreted unless otherwise specified. The embodiments are exemplary and do not limit the scope of the present invention in any way. All features or combinations thereof described in the embodiments are not necessarily essential to the invention.

Figure 2:
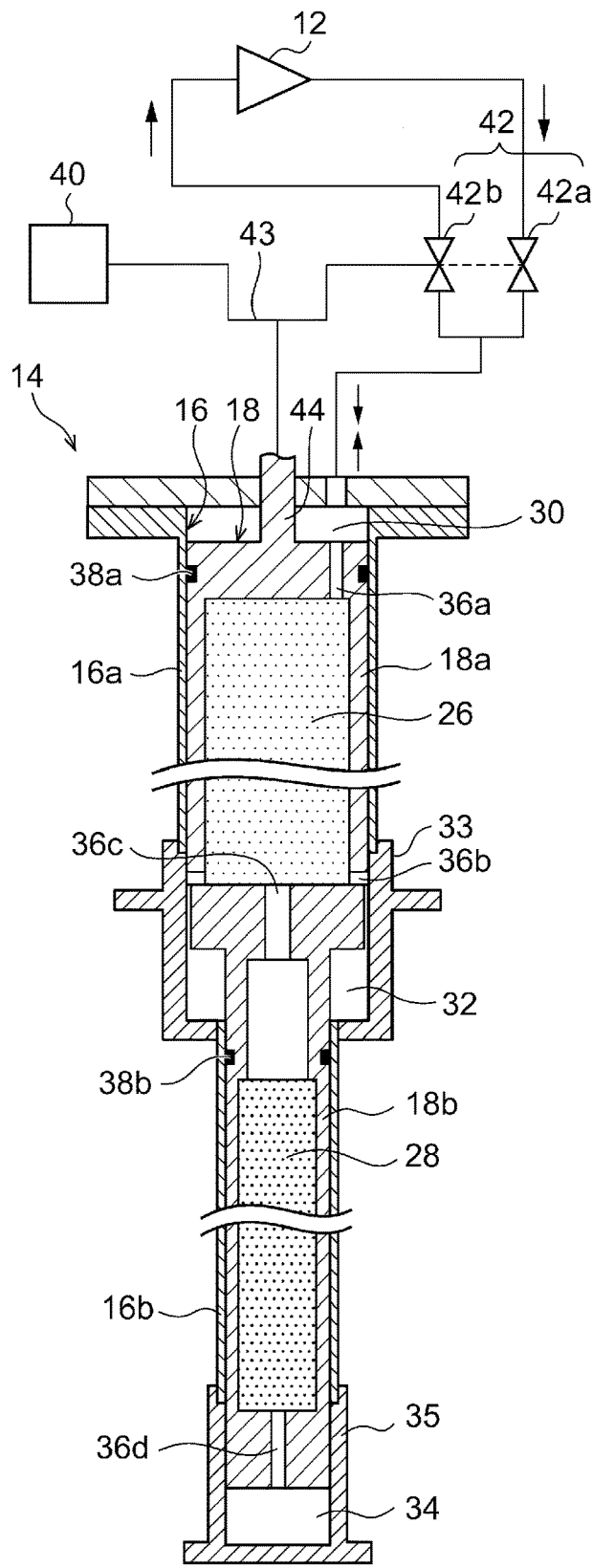
FIG. 2 is a diagram schematically showing the cryocooler according to the embodiment.

FIG. 1 and FIG. 2 are views schematically showing a cryocooler 10 according to an embodiment. The cryocooler is, for example, a two-stage type Gifford-McMahon (GM) cryocooler. FIG. 1 schematically shows a compressor 12 and an expander 14 configuring the cryocooler 10 together with a controller 100, and FIG. 2 shows an internal structure of the expander 14 of the cryocooler 10. The controller 100 is provided to control the cryocooler 10.

The compressor 12 is configured to recover a working gas of the cryocooler 10 from the expander 14, pressurize the recovered working gas, and supply the working gas to the expander 14 again. A refrigeration cycle of the cryocooler 10 is configured by the compressor 12 and the expander 14, whereby the cryocooler 10 can provide desired cryogenic cooling. The expander 14 is also referred to as a cold head. The working gas is also called a refrigerant gas, and other suitable gases may be used although a helium gas is typically used. To facilitate understanding, a direction in which the working gas flows is shown with arrows in FIG. 1.

In general, both of the pressure of a working gas supplied from the compressor 12 to the expander 14 and the pressure of a working gas recovered from the expander 14 to the compressor 12 are considerably higher than the atmospheric pressure, and can also be called a first high pressure and a second high pressure, respectively. For convenience of description, the first high pressure and the second high pressure are simply called a high pressure and a low pressure, respectively. Typically, the high pressure is, for example, 2 to 3 MPa. The low pressure is, for example, 0.5 to 1.5 MPa, and is, for example, about 0.8 MPa. For better understanding, a direction in which the working gas flows is shown with arrows.

The expander 14 includes a cryocooler cylinder 16, a displacer assembly (hereinafter, may be simply referred to as a displacer) 18, and a cryocooler housing 20. The cryocooler cylinder 16 guides the linear reciprocation of the displacer 18, and forms expansion chambers (32, 34) as expansion spaces for the working gas between the displacer 18 and the cryocooler cylinder 16. The cryocooler cylinder 16 and the cryocooler housing 20 are coupled to each other, whereby a casing of the expander 14, that is, a hermetic container that accommodates the displacer 18 is formed.

In the present specification, in order to describe a positional relationship between components of the cryocooler 10, for convenience of description, a side close to a top dead center of axial reciprocation of a displacer will be referred to as "up" and a side close to a bottom dead center will be referred to as "down". The top dead center is the position of the displacer at which the volume of an expansion space is maximum, and the bottom dead center is the position of the displacer at which the volume of the expansion space is minimum. Since a temperature gradient in which the temperature drops from an upper side to a lower side in an axial direction is generated during the operation of the cryocooler 10, the upper side can also be called a high temperature side and the lower side can also be called a low temperature side.

The cryocooler cylinder 16 includes a first cylinder 16a and a second cylinder 16b. The first cylinder 16a and the second cylinder 16b each are, for example, a member that has a cylindrical shape, and the second cylinder 16b has a diameter smaller than that of the first cylinder 16a. The first cylinder 16a and the second cylinder 16b are coaxially disposed, and a lower end of the first cylinder 16a is strongly connected to an upper end of the second cylinder 16b.

The displacer assembly 18 includes a first displacer 18a and a second displacer 18b that are connected to each other, and the displacers move integrally. The first displacer 18a and the second displacer 18b each are, for example, a member that has a cylindrical shape, and the second displacer 18b has a diameter smaller than that of the first displacer 18a. The first displacer 18a and the second displacer 18b are coaxially disposed.

The first displacer 18a is accommodated in the first cylinder 16a, and the second displacer 18b is accommodated in the second cylinder 16b. The first displacer 18a can reciprocate in the axial direction along the first cylinder 16a, and the second displacer 18b can reciprocate in the axial direction along the second cylinder 16b.

As shown in FIG. 2, the first displacer 18a accommodates a first regenerator 26. The first regenerator 26 is formed by filling a tubular main body portion of the first displacer 18a with, for example, a wire mesh made of, such as copper, or other appropriate first regenerator material. An upper lid portion and a lower lid portion of the first displacer 18a may be provided as members separate from the main body portion of the first displacer 18a, or the first regenerator material may be accommodated in the first displacer 18a by fixing the upper lid portion and the lower lid portion of the first displacer 18a to the main body through appropriate means such as fastening and welding.

Similarly, the second displacer 18b accommodates a second regenerator 28. The second regenerator 28 is formed by filling a tubular main body portion of the second displacer 18b with, for example, a non-magnetic regenerator material such as bismuth, a magnetic regenerator material such as $HoCu_2$, or other appropriate second regenerator material. The second regenerator material may be molded into a granular shape. An upper lid portion and a lower lid portion of the second displacer 18b may be provided as members separate from the main body portion of the second displacer 18b, or the second regenerator material may be accommodated in the second displacer 18b by fixing the lower lid portion and the upper lid portion of the second displacer 18b to the main body through appropriate means such as fastening and welding.

The displacer 18 forms, inside the cryocooler cylinder 16, a room temperature chamber 30, a first expansion chamber 32, and a second expansion chamber 34. In order to exchange heat with a desired object or medium to be cooled by the cryocooler 10, the expander 14 includes a first cooling stage 33 and a second cooling stage 35. The room temperature chamber 30 is formed between the upper lid portion of the first displacer 18a and an upper portion of the first cylinder 16a. The first expansion chamber 32 is formed between the lower lid portion of the first displacer 18a and the first cooling stage 33. The second expansion chamber 34 is formed between the lower lid portion of the second displacer 18b and the second cooling stage 35. The first cooling stage 33 is fixed to a lower portion of the first cylinder 16a to surround the first expansion chamber 32, and the second cooling stage 35 is fixed to a lower portion of the second cylinder 16b to surround the second expansion chamber 34.

The first regenerator 26 is connected to the room temperature chamber 30 through a working gas flow path 36a formed in the upper lid portion of the first displacer 18a, and is connected to the first expansion chamber 32 through a working gas flow path 36b formed in the lower lid portion of the first displacer 18a. The second regenerator 28 is connected to the first regenerator 26 through a working gas flow path 36c formed from the lower lid portion of the first displacer 18a to the upper lid portion of the second displacer 18b. In addition, the second regenerator 28 is connected to the second expansion chamber 34 through a working gas flow path 36d formed in the lower lid portion of the second displacer 18b.

In order to introduce working gas flow between the first expansion chamber 32, the second expansion chamber 34, and the room temperature chamber 30 to the first regenerator 26 and the second regenerator 28 instead of a clearance between the cryocooler cylinder 16 and the displacer 18, a first seal 38a and a second seal 38b may be provided. The first seal 38a may be mounted on the upper lid portion of the first displacer 18a to be disposed between the first displacer 18a and the first cylinder 16a. The second seal 38b may be mounted on the upper lid portion of the second displacer 18b to be disposed between the second displacer 18b and the second cylinder 16b.

Figure 3:
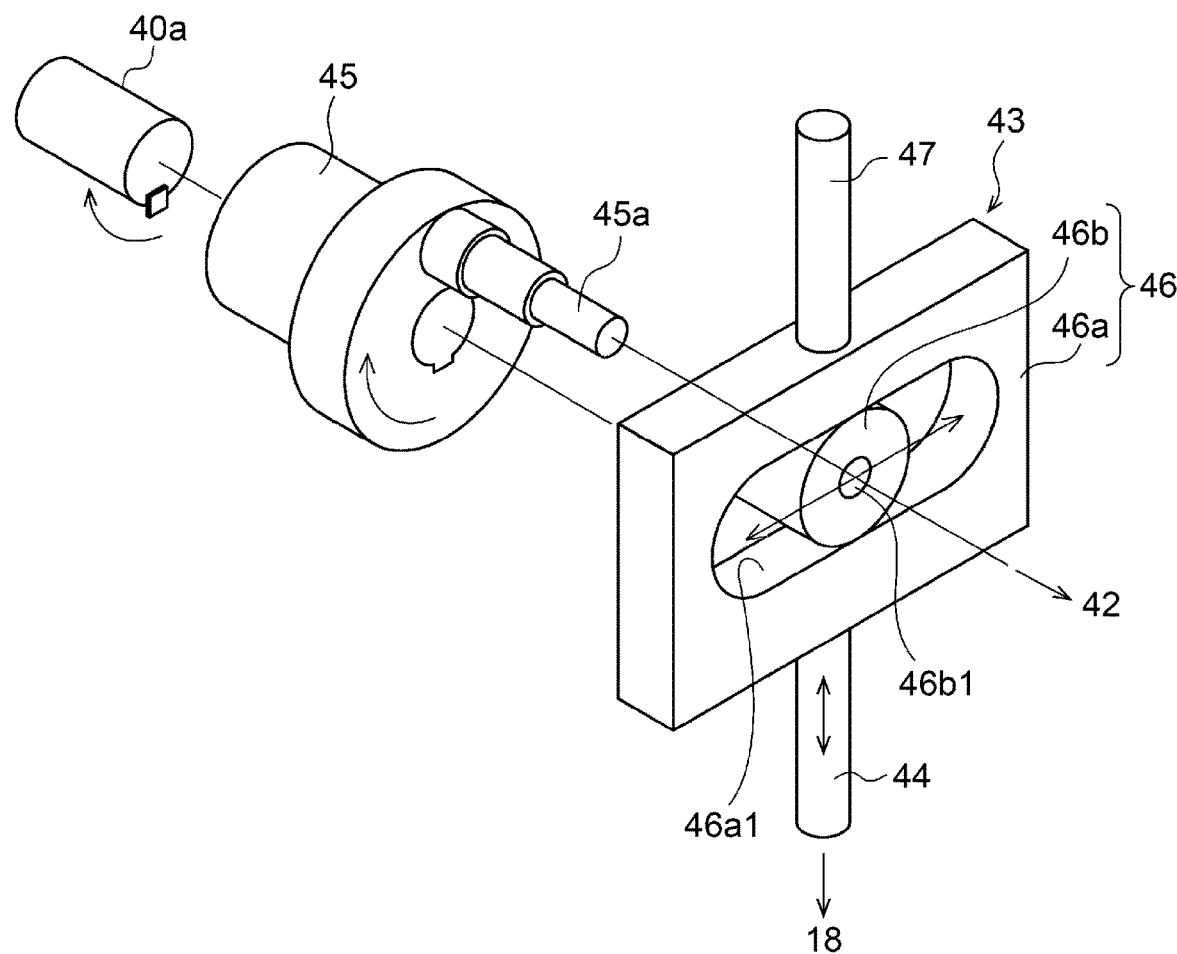
FIG. 3 is an exploded perspective view schematically showing a drive mechanism of an expander of the cryocooler according to the embodiment.

Further, the expander 14 includes an expander motor 40 and a rotary valve 42. The expander motor 40 is provided in the expander 14 as a drive source for the displacer 18 and the rotary valve 42. As shown in FIG. 3, the expander motor 40 includes a motor rotary shaft 40a that outputs the rotation of the expander motor 40. The expander motor 40 is an electric motor capable of variably controlling the rotation speed of the motor rotary shaft 40a, and may be, for example, a permanent magnet type motor driven by three-phase AC or a stepping motor. The expander motor 40 is attached to the cryocooler housing 20. The rotary valve 42 is accommodated in the cryocooler housing 20.

The displacer 18 is connected to the motor rotary shaft 40a so as to reciprocate linearly by the rotation of the motor rotary shaft 40a, and changes the volume of the expansion space of the working gas by the reciprocation. One rotation of the motor rotary shaft 40a causes one reciprocation of the displacer 18.

Here, assuming that one rotation of the motor rotary shaft 40a is divided into four angle ranges, the displacer 18 passes through the top dead center within a first angle range, passes through a midpoint between the top dead center and the bottom dead center within a second angle range following the first angle range, passes through the bottom dead center in a third angle range following the second angle range, and passes through the midpoint in the fourth angle range following the third angle range. Following the fourth angle range, the rotation of the motor rotary shaft 40a enters the first angle range. When the rotation angle of the motor rotary shaft 40a when the displacer 18 is at the top dead center is represented as 0 degrees, it is assumed that the first angle range, the second angle range, the third angle range, and the fourth angle range include 0 degrees, 90 degrees, 180 degrees, and 270 degrees, respectively.

The rotary valve 42 is configured to, functionally, include a high pressure valve 42a and a low pressure valve 42b as shown in FIG. 2, and generate periodic pressure fluctuations in the cryocooler cylinder 16. In the rotary valve 42, the intake start timing and the intake end timing of the working gas into the expansion space are determined by the high pressure valve 42a, and the exhaust start timing and the exhaust end timing of the working gas from the expansion space are determined by the low pressure valve 42b. A working gas discharge port of the compressor 12 is connected to the room temperature chamber 30 via the high pressure valve 42a, and a working gas intake port of the compressor 12 is connected to the room temperature chamber 30 via the low pressure valve 42b. The high pressure valve 42a and the low pressure valve 42b are configured to open and close selectively and alternately (that is, such that when one is open, the other is closed). Various known forms can be adopted for the working gas flow path formed in the rotary valve 42 to form the high pressure valve 42a and the low pressure valve 42b, and are not described in detail here.

The rotary valve 42 is connected to the motor rotary shaft 40a so as to be rotated by the rotation of the motor rotary shaft 40a, and controls intake and exhaust of the working gas into the expansion space. One rotation of the motor rotary shaft 40a causes one rotation of the rotary valve 42. In design of the rotary valve 42, the intake start timing is determined in association with the bottom dead center of the displacer 18, and the exhaust start timing is determined in association with the top dead center of the displacer 18. In addition, the intake end timing and the exhaust end timing may be determined in association with the top dead center and the bottom dead center of the displacer 18, respectively.

The intake start timing is set between passing through the midpoint between the top dead center and the bottom dead center during the downward movement of the displacer 18 and reaching the bottom dead center, or in the vicinity of the bottom dead center. For example, the intake start timing may be set between, for example, 120 degrees (or 150 degrees) and 180 degrees with respect to the rotation angle of the motor rotary shaft 40a. In addition, the intake end timing is set prior to the exhaust start timing during the upward movement of the displacer 18.

The exhaust start timing is set between passing through the midpoint between the top dead center and the bottom dead center during the upward movement of the displacer 18 and reaching the top dead center, or in the vicinity of the top dead center. For example, the exhaust start timing may be set between, for example, 300 degrees (or 330 degrees) and 360 degrees with respect to the rotation angle of the motor rotary shaft 40a. In addition, the exhaust end timing is set prior to the intake start timing during the downward movement of the displacer 18.

The phase of the refrigeration cycle is determined by a combination of the position of the displacer 18 (that is, the volume of the expansion space) and the rotation angle of the rotary valve 42 (that is, the pressure of the expansion space). One rotation of the expander motor implements one refrigeration cycle, and the rotation angle of the motor rotary shaft 40a can correspond to the phase of the refrigeration cycle.

In addition, the expander 14 may include a temperature sensor 48 that measures the temperature of the second cooling stage 35 (and/or the first cooling stage 33) and outputs a measured temperature signal indicating the measured temperature.

FIG. 3 is an exploded perspective view schematically showing a drive mechanism of the expander 14 of the cryocooler 10 according to the embodiment. The motor rotary shaft 40*a* is connected to the displacer 18 via the motion conversion mechanism 43 and the displacer drive shaft 44. In this embodiment, the motion conversion mechanism 43 is a scotch yoke mechanism that converts the rotation of the motor rotary shaft 40*a* into linear motion.

As shown in FIG. 3, the motion conversion mechanism 43 includes a crank 45 and a scotch yoke 46. The crank 45 is fixed to the motor rotary shaft 40*a*. The crank has a crank pin 45*a* at a position eccentric from a position where the motor rotary shaft 40*a* is fixed. The crank pin 45*a* extends parallel to the motor rotary shaft 40*a* on the side opposite to the motor rotary shaft 40*a* with respect to the crank 45.

The scotch yoke 46 includes a yoke plate 46*a* and a roller bearing 46*b*. To the yoke plate 46*a*, the upper rod 47 is fixed at the center of the upper portion thereof so as to extend upward, and the displacer drive shaft 44 is fixed at the center of the lower portion thereof so as to extend downward. A horizontally long window 46*a*1 extending in a direction perpendicular to an extending direction (that is, an axial direction) of the upper rod 47 and the displacer drive shaft 44 is formed at the center of the yoke plate 46*a*, and the roller bearing 46*b* is rollably disposed in the horizontally long window 46*a*1. An engagement hole 46*b*1 that engages with the crank pin 45*a* is formed at the center of the roller bearing 46*b*, and the crank pin 45*a* penetrates the engagement hole 46*b*1. The upper rod 47 and the displacer drive shaft 44 may be slidably supported by the cryocooler housing 20 shown in FIG. 1, respectively.

The displacer drive shaft 44 connects the motion conversion mechanism 43 to the displacer 18 (specifically, the first displacer 18*a* as shown in FIG. 2). The displacer drive shaft 44 has one end fixed to the yoke plate 46*a*, and the other end fixed to the displacer 18. As shown in FIG. 1, the motion conversion mechanism 43 is accommodated in the cryocooler housing 20, and extends from the cryocooler housing 20 into the cryocooler cylinder 16. As shown in FIG. 2, the displacer drive shaft 44 passes through the room temperature chamber 30 and is fixed to the upper lid portion of the first displacer 18*a*.

The motor rotary shaft 40*a* is also connected to the rotary valve 42. The rotary valve 42 is disposed on the side opposite to the expander motor 40 with respect to the motion conversion mechanism 43 such that the rotary shaft of the rotary valve 42 is coaxial with the motor rotary shaft 40*a*. The rotary valve 42 may include a stationary valve main body fixed to the cryocooler housing 20, and a valve disc supported by the cryocooler housing 20 so as to be rotatable and slidable with respect to the valve main body, or may be configured such that the high pressure valve 42*a* and the low pressure valve 42*b* may be alternately opened and closed by rotational sliding of the valve disc with respect to the valve main body. A crank pin 45*a* that penetrates the engagement hole 46*b*1 is fixed to the valve disc, whereby the motor rotary shaft 40*a* may rotate the valve disc with respect to the valve main body.

When the motor rotary shaft 40*a* rotates, the roller bearing 46*b* engaged with the crank pin 45*a* reciprocates along the horizontally long window 46*a*1 while rotating in a circular motion, whereby the scotch yoke 46 and the displacer drive shaft 44 reciprocate in the axial direction. Therefore, the displacer 18 reciprocates in the axial direction in the cryocooler cylinder 16 by the rotation of the expander motor 40. Further, the rotary valve 42 also rotates by the rotation of the expander motor 40.

With reference to FIG. 1 again, the compressor 12 includes a high pressure gas outlet 50, a low pressure gas inlet 51, a high pressure flow path 52, a low pressure flow path 53, a first pressure sensor 54, a second pressure sensor 55, a compressor main body 56, and a compressor casing 58. The high pressure gas outlet 50 is installed in the compressor casing 58 as a working gas discharge port of the compressor 12, and the low pressure gas inlet 51 is installed in the compressor casing 58 as a working gas intake port of the compressor 12. The high pressure flow path 52 connects the discharge port of the compressor main body 56 to the high pressure gas outlet 50, and the low pressure flow path 53 connects the low pressure gas inlet 51 to the intake port of the compressor main body 56. The compressor casing 58 accommodates the high pressure flow path 52, the low pressure flow path 53, the first pressure sensor 54, the second pressure sensor 55, and the compressor main body 56. The compressor 12 will also be referred to as a compressor unit.

The compressor main body 56 is configured to internally compress the working gas sucked from an intake port and to discharge the working gas from a discharge port. The compressor main body 56 may be, for example, a scroll type pump, a rotary type pump, or other pumps that pressurize the working gas. In this embodiment, the compressor main body 56 is configured to discharge the working gas at a fixed and constant flow rate. Alternatively, the compressor main body 56 may be configured to change the flow rate of the working gas to be discharged. The compressor main body 56 will be referred to as a compression capsule in some cases.

The first pressure sensor 54 is disposed in the high pressure flow path 52 to measure the pressure of the working gas flowing in the high pressure flow path 52. The first pressure sensor 54 is configured to output a first measured pressure signal P1 indicating the measured pressure. The second pressure sensor 55 is disposed in the low pressure flow path 53 to measure the pressure of the working gas flowing in the low pressure flow path 53. The second pressure sensor 55 is configured to output a second measured pressure signal P2 indicating the measured pressure. Therefore, the first pressure sensor 54 and the second pressure sensor 55 can also be called a high pressure sensor and a low pressure sensor, respectively. Further, in the present specification, any one of the first pressure sensor 54 and the second pressure sensor 55, or both of the first pressure sensor 54 and the second pressure sensor 55 may be collectively referred to as a "pressure sensor".

The compressor 12 may have various other components. For example, the high pressure flow path 52 may be provided with an oil separator, an adsorber, or the like. A storage tank and other components may be provided in the low pressure flow path 53. In addition, an oil circulation system that cools the compressor main body 56 with an oil, a cooling system that cools the oil, or the like may be provided in the compressor 12. In order to prevent excessive pressure in the high pressure flow path 52, a bypass flow path for releasing pressure from the high pressure flow path 52 to the low pressure flow path 53 may be provided.

Further, the cryocooler 10 includes a gas line 62 that circulates a working gas between the compressor 12 and the expander 14. The gas line 62 includes a high pressure line 63 that connects the compressor 12 to the expander 14 so as to supply a high pressure working gas from the compressor 12 to the expander 14, and a low pressure line 64 that connects the compressor 12 to the expander 14 so as to recover a low pressure working gas from the expander 14 to the compressor 12. The cryocooler housing 20 of the expander 14 is provided with a high pressure gas inlet 22 and a low pressure gas outlet 24. The high pressure gas inlet 22 is connected to the high pressure gas outlet 50 by a high-pressure pipe 65, and the low pressure gas outlet 24 is connected to the low pressure gas inlet 51 by a low-pressure pipe 66. The high pressure line 63 is formed by the high-pressure pipe 65 and the high pressure flow path 52, and the low pressure line 64 is formed by a low-pressure pipe 66 and a low pressure flow path 53. The rotary valve 42 operates so as to alternately connect the high pressure line 63 and the low pressure line 64 to the expansion space in the expander 14.

It is not essential that the pressure measurement units such as the first pressure sensor 54 and the second pressure sensor 55 are provided in the compressor 12, and the pressure measurement units may be provided at any place such as the gas line 62 and the expander 14 in which the pressure can be measured. For example, the first pressure sensor 54 may be provided at any location on the high pressure line 63, and the second pressure sensor 55 may be provided at any location on the low pressure line 64.

As shown in FIG. 1, the cryocooler 10 is provided with a controller 100 that controls the expander motor 40. The controller 100 is electrically connected to the first pressure sensor 54 and the second pressure sensor 55 to acquire the first measured pressure signal P1 and the second measured pressure signal P2. In addition, the controller 100 is electrically connected to the temperature sensor 48 to acquire the measured temperature signal from the temperature sensor 48.

Although details will be described later, the controller 100 receives at least one of the first measured pressure signal P1 and the second measured pressure signal P2, detects a feature point that periodically appears in the measured pressure during the operation of the cryocooler 10, acquires a motor drive waveform S indicating the command rotation speed of the motor rotary shaft 40a, and outputs the motor drive waveform S in synchronization with the feature point that periodically appears. The command rotation speed of the motor rotary shaft 40a is determined to change within one rotation of the motor rotary shaft 40a.

As an exemplary configuration, the controller 100 includes a processing unit (processor) 110, a storage unit (memory) 112, and a motor drive unit (motor driver) 120. The processing unit 110 receives at least one of the first measured pressure signal P1 and the second measured pressure signal P2, detects a feature point that periodically appears in the measured pressure during the operation of the cryocooler 10, acquires a motor drive waveform S from the storage unit 112, and outputs the motor drive waveform S to the motor drive unit 120 in synchronization with the feature point that periodically appears. The storage unit 112 stores the motor drive waveform S.

The motor drive unit 120 is supplied with power from an external power supply 80 such as a commercial power supply (three-phase AC power supply). The expander motor 40 may be connected to an external power supply 80 via the compressor 12, for example, and supplied with power. In this case, the compressor 12 may be regarded as a power supply of the expander motor 40.

The motor drive unit 120 generates a motor drive current from the external power supply 80 according to the received motor drive waveform S, and supplies the motor drive current to the expander motor 40. In this way, the expander motor 40 rotates the motor rotary shaft 40a at the command rotation speed indicated by the motor drive waveform S. According to the motor drive waveform S, the motor rotary shaft 40a rotates while increasing or decreasing the rotation speed in one rotation. By the rotation of the expander motor 40, the cryocooler 10 causes a refrigeration cycle to provide cryogenic cooling.

The motor drive unit 120 may include an inverter, thereby controlling the operating frequency of the expander motor 40. The expander motor 40 can rotate the motor rotary shaft 40a at the number of rotations determined by the output frequency of the inverter. As an example, the output frequency of the inverter (that is, the operating frequency of the expander motor 40) may vary in a range of 30 Hz to 100 Hz, or a range of 40 Hz to 70 Hz. The cryocooler 10 can change the frequency (number of times per unit time) of the refrigeration cycle by controlling the operating frequency of the expander motor 40.

In the shown example, the controller 100 is provided separately from and connected to the compressor 12 and the expander 14, but the present invention is not limited thereto. The controller 100 may be mounted on the compressor 12. The controller 100 may be provided in the expander 14, such as being mounted on the expander motor 40. Alternatively, the controller 100 may be divided into a plurality of portions and provided in the cryocooler 10 in such a manner that a part of the controller 100 (for example, the processing unit 110 and the storage unit 112) is mounted on the compressor 12, and another part of the controller 100 (for example, the motor drive unit 120) is mounted on the expander 14.

The controller 100 is implemented by elements or circuits such as a CPU or a memory of a computer as a hardware configuration, and is implemented by a computer program or the like as a software configuration. However, in FIG. 1, they are appropriately depicted as functional blocks which are implemented by the cooperation thereof. It is clear for those skilled in the art that such a functional block can be implemented in various manners through combination between hardware and software.

When the compressor 12 and the expander motor 40 are operated, the cryocooler 10 generates periodic volume fluctuations in the first expansion chamber 32 and the second expansion chamber 34 and pressure fluctuations of the working gas synchronized with the periodic volume fluctuations. Typically, in the intake process, the low pressure valve 42b is closed and the high pressure valve 42a is opened, and thus the high pressure working gas flows from the compressor 12 into the room temperature chamber 30 through the high pressure valve 42a and is supplied to the first expansion chamber 32 through the first regenerator 26 and supplied to the second expansion chamber 34 through the second regenerator 28. As described above, the first expansion chamber 32 and the second expansion chamber 34 are pressurized from the low pressure to the high pressure. In this case, the displacer 18 is moved upward from the bottom dead center to the top dead center, and the volumes of the first expansion chamber 32 and the second expansion chamber 34 are increased. When the high pressure valve 42a is closed, the intake process is ended.

In the exhaust process, the high pressure valve 42a is closed and the low pressure valve 42b is opened such that the high pressure first expansion chamber 32 and second expansion chamber 34 are opened to the low pressure working gas intake port of the compressor 12. Therefore, the working gas is expanded in the first expansion chamber 32 and the second expansion chamber 34, and as a result, the working gas having a low pressure is discharged to the room temperature chamber 30 from the first expansion chamber 32 and the second expansion chamber 34 through the first regenerator 26 and the second regenerator 28. In this case, the displacer 18 is moved downward from the top dead center to the bottom dead center, and the volumes of the first expansion chamber 32 and the second expansion chamber 34 are reduced. The working gas is recovered from the expander 14 to the compressor 12 through the low pressure valve 42b. When the low pressure valve 42b is closed, the exhaust process is ended.

The working gas recovered from the expander 14 to the compressor 12 enters the low pressure gas inlet 51 of the compressor 12 through the low pressure line 64, that is, from the low pressure gas outlet 24 of the expander 14 through the low-pressure pipe 66, and returns to the compressor main body 56 via the low pressure flow path 53. The working gas is compressed and pressurized by the compressor main body 56. The working gas to be supplied from the compressor 12 to the expander 14 exits from the high pressure gas outlet 50 of the compressor 12 through the high pressure line 63, that is, from the compressor main body 56 through the high pressure flow path 52, and is further supplied to the expander 14 via the high-pressure pipe 65 and the high pressure gas inlet 22 of the expander 14.

As described above, for example, a refrigeration cycle such as a GM cycle is configured, and the first cooling stage 33 and the second cooling stage 35 are cooled to a desired cryogenic temperature. The first cooling stage 33 may be cooled to a first cooling temperature within a range of, for example, about 20 K to about 40 K. The second cooling stage 35 may be cooled to a second cooling temperature (for example, about 1 K to about 4 K) lower than the first cooling temperature.

The cryocooler 10 can perform initial cooling and steady operation following the initial cooling. The initial cooling is an operation mode of the expander 14 that performs rapid cooling from the initial temperature to the cryogenic temperature when the cryocooler 10 is started, and the steady operation is an operation mode of the expander 14 that maintains the state of being cooled to the cryogenic temperature through the initial cooling. The initial temperature may be an ambient temperature (for example, room temperature). The expander 14 is cooled to a standard cooling temperature (for example, a first cooling temperature and a second cooling temperature) through the initial cooling, and is maintained within an allowable temperature range of a cryogenic temperature including the standard cooling temperature in the steady operation. The standard cooling temperature is different depending on applications and settings of the cryocooler 10, but is typically about 4.2 K or lower in, for example, a cooling application of a superconducting device. In some other cooling applications, the standard cooling temperature may be, for example, about 10 K to 20 K or 10 K or lower. As described above, the initial cooling can also be referred to as a cooldown.

The switching from the initial cooling to the steady operation may be controlled by the controller 100. For example, the controller 100 may compare the measured temperature of the second cooling stage 35 (and/or the first cooling stage 33) with a preset switching temperature, based on the measured temperature signal from the temperature sensor 48, execute the initial cooling when the measured temperature is higher than the switching temperature, and transition from the initial cooling to the steady operation when the measured temperature is equal to or lower than the switching temperature. The switching temperature may be the above-described standard cooling temperature, or may be a temperature somewhat higher than the standard cooling temperature (for example, a temperature higher than the standard cooling temperature by a temperature within 5 K or within 10 K).

In general, in steady cooling, the cryocooler 10 may provide a cooling capacity balanced with a heat load, and thus, a very high cooling capacity is often not required. On the other hand, since the initial cooling is merely preparation for starting the cooling of the object by the cryocooler 10, it is desirable that the required time is as short as possible. Therefore, the cooling capacity of the cryocooler 10 that is undergoing initial cooling may be increased by increasing the number of rotations of the expander motor 40 in the initial cooling as compared with the steady operation.

For example, the controller 100 determines the current operation mode of the cryocooler 10, and when the cryocooler 10 is undergoing initial cooling, the controller may control the motor drive unit 120 such that the operating frequency of the expander motor 40 is higher compared to a case where the cryocooler 10 is undergoing a steady operation. The operating frequency of the expander motor 40 in the initial cooling may be higher than an input frequency (for example, 50 Hz or 60 Hz) from the external power supply 80 to the motor drive unit 120, and the operating frequency of the expander motor 40 in the steady operation may be equal to or lower than the input frequency.

However, while the cooling capacity can be increased by driving the expander motor 40 at high speed in this manner, the load applied to the expander motor 40 for driving the displacer 18 (and the rotary valve 42) also increases. Therefore, in the initial cooling, it is desired to achieve both high cooling capacity (that is, reduced cooling time) and reduction of the load applied to the expander motor 40. On the other hand, from the viewpoint of improving energy saving, in the steady operation, it is desired to maximize the PV work obtained in one refrigeration cycle and to perform efficient cooling. As described above, the optimum operation method for the cryocooler 10 differs depending on the scene.

Therefore, in the present embodiment, the processing unit 110 of the controller 100 may receive at least one of the first measured pressure signal P1 and the second measured pressure signal P2, detect a feature point that periodically appears in the measured pressure during the operation of the cryocooler 10, select one motor drive waveform S from a plurality of motor drive waveforms, and output the selected motor drive waveform S to the motor drive unit 120 in synchronization with the feature point that appears periodically. The plurality of motor drive waveforms indicate the command rotation speeds of the motor rotary shaft 40a, which are determined to change in manners different from each other in one rotation of the motor rotary shaft 40a. The storage unit 112 stores these motor drive waveforms. The plurality of motor drive waveforms may include a first motor drive waveform and a second motor drive waveform, as will be described later. The processing unit 110 may determine the current operation mode of the cryocooler 10, select the first motor drive waveform in the case of initial cooling, and select the second motor drive waveform in the steady operation.

Figure 4:
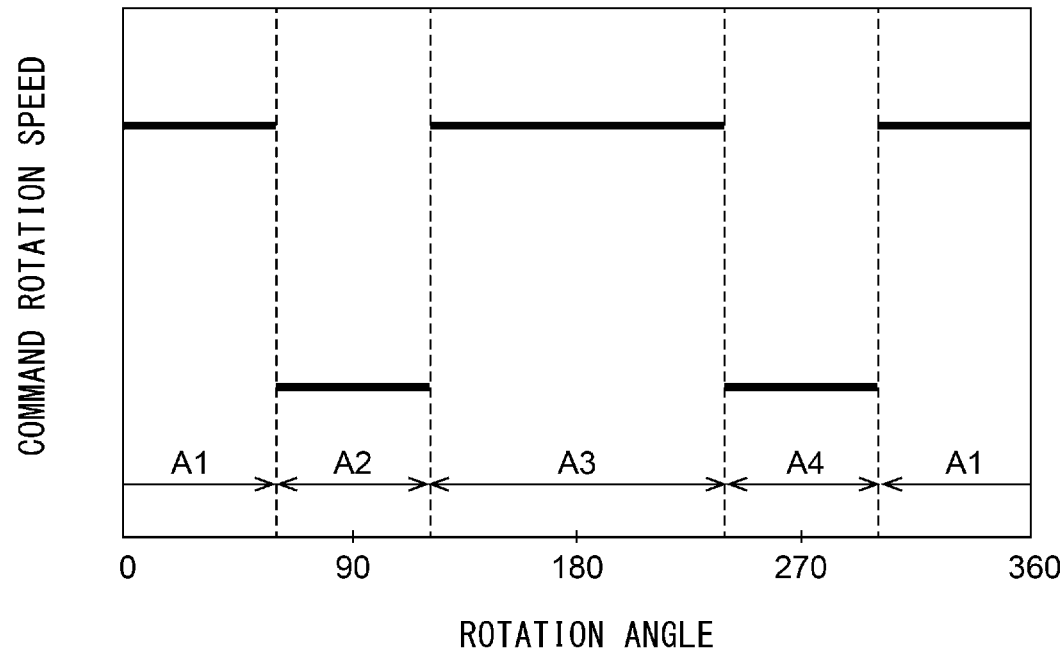
FIG. 4 is a diagram showing an example of a change in a command rotation speed of an expander motor indicated by a first motor drive waveform according to the embodiment.
Figure 5:
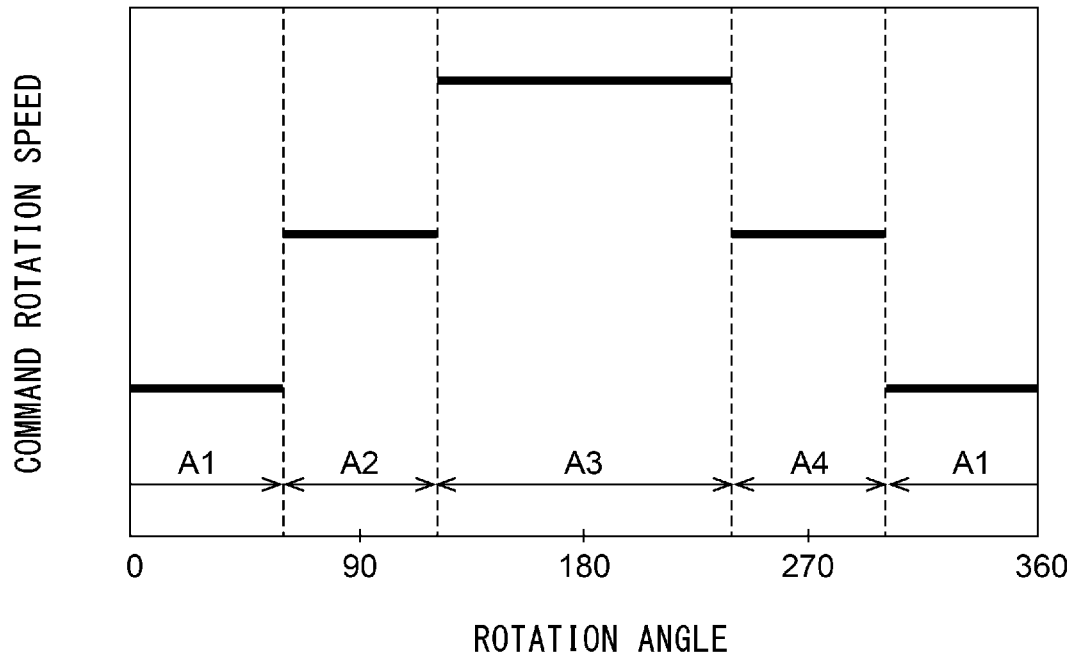
FIG. 5 is a diagram showing an example of a change in a command rotation speed of an expander motor indicated by a second motor drive waveform according to the embodiment.

FIG. 4 is a diagram showing an example of a change in a command rotation speed of the expander motor 40 indicated by the first motor drive waveform according to the embodiment. FIG. 5 is a diagram showing an example of a change in a command rotation speed of the expander motor 40 indicated by the second motor drive waveform according to the embodiment. FIGS. 4 and 5 illustrate changes in the command rotation speed in one rotation of the motor rotary shaft 40a. The vertical axis represents the value of the command rotation speed, and the horizontal axis represents the rotation angle of the motor rotary shaft 40a. As described above, the rotation angle of the motor rotary shaft 40a when the displacer 18 is at the top dead center is represented as 0 degrees.

The displacer 18 passes through the top dead center in a first angle range A1, passes through a midpoint between the top dead center and the bottom dead center within a second angle range A2 following the first angle range A1, passes through the bottom dead center in a third angle range A3 following the second angle range A2, and passes through the midpoint in the fourth angle range A4 following the third angle range A3. The first angle range A1, the second angle range A2, the third angle range A3, and the fourth angle range A4 include 0 degrees, 90 degrees, 180 degrees, and 270 degrees, respectively. The intake start timing of the rotary valve 42 is set in the third angle range A3, and the exhaust start timing is set in the first angle range A1.

In a case where the expander motor 40 is connected to the displacer 18 via the motion conversion mechanism 43, when the rotation angles of the motor rotary shaft 40*a* are around 90 degrees and around 270 degrees, it is known from mechanical analysis that a load applied to the expander motor 40 increases.

Therefore, as shown in FIG. 4, the first motor drive waveform is determined such that the command rotation speed of the motor rotary shaft 40*a* decreases in the second angle range A2 as compared with the first angle range A1. Further, the command rotation speed of the motor rotary shaft 40*a* increases in the third angle range A3 as compared with the second angle range A2. Similarly, the first motor drive waveform is determined such that the command rotation speed of the motor rotary shaft 40*a* decreases in the fourth angle range A4 as compared with the third angle range A3, and increases in the first angle range A1 as compared with the fourth angle range A4.

In this manner, since the command rotation speed of the motor rotary shaft 40*a* decreases in the second angle range A2 including 90 degrees and the fourth angle range A4 including 270 degrees, the rotation of the motor rotary shaft 40*a* is decelerated in these angle ranges. Therefore, the load applied to the expander motor 40 can be reduced in these angle ranges. At the same time, since the motor rotary shaft 40*a* can be rotated at a relatively high speed at other rotation angles (that is, the first angle range A1 and the third angle range A3), the frequency of the refrigeration cycle can be increased as compared with the case where the motor rotary shaft 40*a* is rotated at a constant low rotation speed, and the cooling capacity of the cryocooler 10 can be increased. Therefore, both the reduction of the cooling time due to the high cooling capacity and the reduction of the load applied to the expander motor 40 can be achieved. Therefore, the first motor drive waveform is suitable for driving the expander motor 40 in the initial cooling.

Further, it is known that PV work obtained in one refrigeration cycle can be increased by reducing the movement speed of the displacer 18 from the exhaust start timing to the top dead center of the displacer 18. Such an effect is more remarkable in a state where the cryocooler 10 is cooled to a cryogenic temperature as in the steady operation.

Therefore, unlike the first motor drive waveform, the second motor drive waveform is determined such that as shown in FIG. 5, the command rotation speed of the motor rotary shaft 40*a* increases in the second angle range A2 as compared with the first angle range A1. The command rotation speed of the motor rotary shaft 40*a* further increases in the third angle range A3 as compared with the second angle range A2. Further, the second motor drive waveform is determined such that the command rotation speed of the motor rotary shaft 40*a* decreases in the fourth angle range A4 as compared with the third angle range A3, and further decreases in the first angle range A1 as compared with the fourth angle range A4.

In this way, the command rotation speed of the motor rotary shaft 40*a* is reduced in the first angle range A1 as compared with other angle ranges. The rotation speed of the motor rotary shaft 40*a* is reduced in the first angle range A1, and the displacer 18 also becomes low speed. Since the first angle range A1 includes the exhaust start timing and the top dead center of the displacer 18, PV work obtained in one refrigeration cycle can be increased. The second motor drive waveform is suitable for driving the expander motor 40 in the steady operation.

The first motor drive waveform and the second motor drive waveform described above are examples of a motor drive waveform that can be adopted, and a change in a rotation speed in one rotation of the motor rotary shaft 40*a* that can be adopted in the embodiment can have various forms. For example, in the first motor drive waveform of FIG. 4, for convenience, the command rotation speeds are equal to each other in the first angle range A1 and the third angle range A3, and equal to each other in the second angle range A2 and the fourth angle range A4, but are not limited to this. The command rotation speeds may be different in the first angle range A1 and the third angle range A3, or may be different in the second angle range A2 and the fourth angle range A4. In addition, for the command rotation speed, equal values may be adopted in the first motor drive waveform and the second motor drive waveform, or different values may be adopted.

In the examples of FIGS. 4 and 5, the widths of the first angle range and the third angle range are equal to each other, and the widths of the second angle range and the fourth angle range are equal to each other. The width of the first angle range A1 and the third angle range A3 is larger than the width of the second angle range A2 and the fourth angle range A4. Angle ranges extend evenly on both sides with reference angles such as 0 degrees, 90 degrees, 180 degrees, and 270 degrees as the center. However, the setting of such angle ranges is not essential, and various other settings are possible. For example, the widths of the respective angle ranges may all be equal or different from each other.

Further, in the above-described example, one rotation of the motor rotary shaft 40*a* is divided into four angle ranges for convenience. However, one rotation of the motor rotary shaft 40*a* may be divided into a smaller number or a larger number of angle ranges. The command rotation speed may be determined for each of the angle ranges. The angle range may be set in the same manner as in the first motor drive waveform and the second motor drive waveform, or may be set differently.

The first motor drive waveform may be used in an operating condition other than the initial cooling. The second motor drive waveform may be used in an operating condition other than the steady operation.

Figure 6:
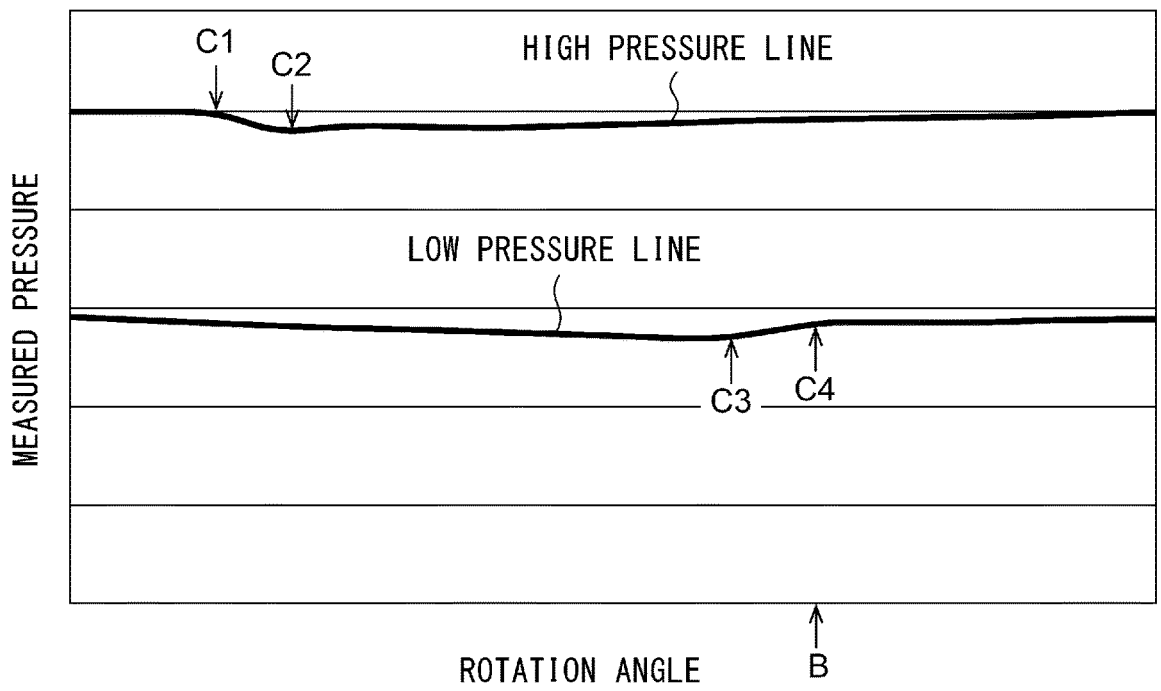
FIG. 6 is a diagram showing an example of feature points that periodically appear in a measured pressure of the cryocooler according to the embodiment.

FIG. 6 is a diagram showing an example of feature points that periodically appear in the measured pressure of the cryocooler 10 according to the embodiment. FIG. 6 illustrates the measured pressures of the high pressure line 63 and the low pressure line 64 in one refrigeration cycle. The vertical axis represents the measured pressure, and the horizontal axis represents the rotation angle of the motor rotary shaft 40*a*. In this example, it is assumed that the top dead center of the displacer 18 corresponds to the rotation angle B.

As described above, in this embodiment, the feature points that periodically appear in the measured pressure during the operation of the cryocooler 10 are detected. This feature point periodically appears in the measured pressure of the pressure sensor as a fluctuation of the working gas pressure associated with the intake process (for example, intake start timing) or the exhaust process (for example, exhaust start timing) of the cryocooler 10. The feature point that appears periodically is a feature point that periodically appears in the measured pressure of the high pressure line 63 due to the intake of the working gas into the expansion space via the rotary valve 42, or a feature point that periodically appears in the measured pressure of the low pressure line 64 due to the exhaust of the working gas from the expansion space via the rotary valve 42. The feature point may be a sign change of the rate of change of the measured pressure. This sign change may be a change from a positive value to zero or a change from a negative value to zero.

Since the high pressure line 63 communicates with the discharge port of the compressor main body 56, the pressure of the high pressure line 63 is basically equal to the discharge pressure of the compressor 12. However, when the high pressure line 63 is connected to the expansion space of the expander 14 via the rotary valve 42 in the intake process of the cryocooler 10, the working gas flows out from the high pressure line 63 to the expander 14, and the pressure of the high pressure line 63 transiently and slightly decreases. For example, a feature point C1 shown in FIG. 6 indicates this pressure drop. The feature point C1 can be regarded as an intake start timing. After that, the pressure of the high pressure line 63 is gradually restored by supplying the working gas from the compressor 12. The feature point C2 indicates a turning point from a decrease to an increase in the pressure of the high pressure line 63. A feature point C2 can be associated with the intake start timing. In this way, the pressure fluctuation of the high pressure line 63 can be detected as a feature point.

Similarly, the pressure fluctuation of the low pressure line 64 can be detected as a feature point. Since the low pressure line 64 communicates with the intake port of the compressor main body 56, the pressure of the low pressure line 64 is basically equal to the intake pressure of the compressor 12. However, when the low pressure line 64 is connected to the expansion space of the expander 14 via the rotary valve 42 in the exhaust process of the cryocooler 10, the working gas flows from the expander 14 into the low pressure line 64, and the pressure of the low pressure line 64 transiently and slightly increases. For example, a feature point C3 shown in FIG. 6 indicates this pressure increase. The feature point C3 can be regarded as an exhaust start timing. After that, the pressure of the low pressure line 64 gradually decreases due to the recovery of the working gas to the compressor 12. A feature point C4 indicates a turning point from an increase to a decrease in the pressure of the low pressure line 64. The feature point C4 can be associated with the exhaust start timing.

A pressure sensor may be provided in the expander 14, and the pressure in the expansion space may be measured by the pressure sensor. In that case, the feature points that periodically appear in the measured pressure of the expansion space may be detected.

Figure 7:
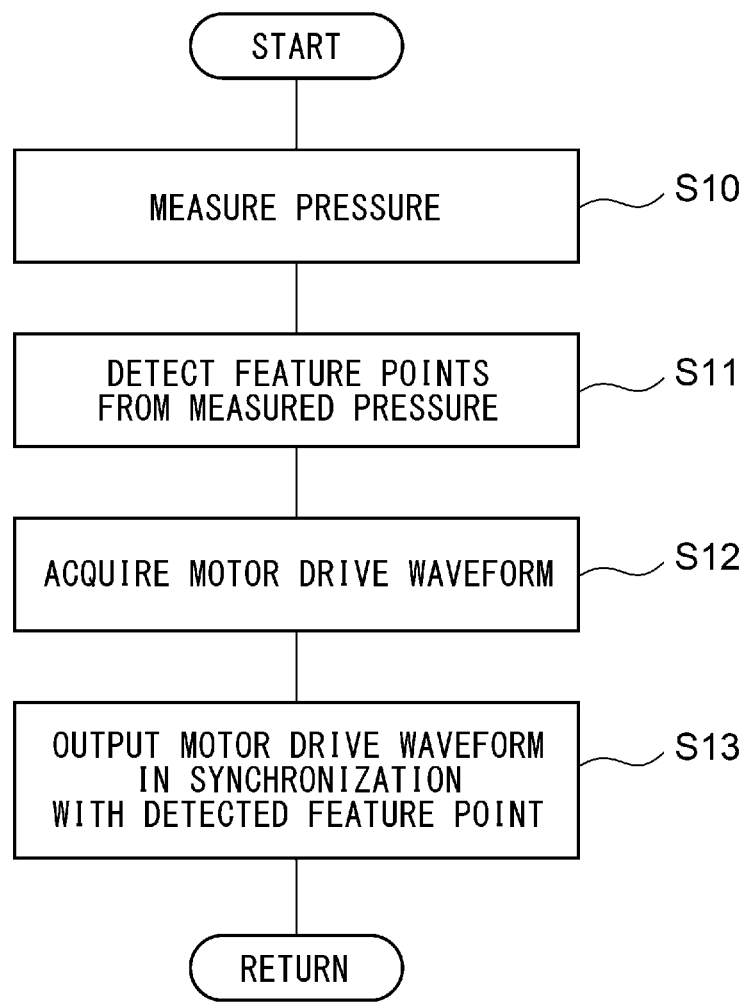
FIG. 7 is a flowchart showing a control method of the cryocooler according to the embodiment.

FIG. 7 is a flowchart showing a control method of the cryocooler 10 according to the embodiment. This method is repeatedly executed by the controller 100 at a predetermined cycle during the operation of the cryocooler 10.

As shown in FIG. 7, in the present method, first, the pressure of the working gas is measured (S10). For example, the pressure of the high pressure line 63 is measured by the first pressure sensor 54. The first pressure sensor 54 outputs the first measured pressure signal P1 representing the measured pressure PH of the high pressure line 63 to the controller 100. Alternatively, the pressure of the low pressure line 64 may be measured by the second pressure sensor 55. The second pressure sensor 55 outputs the second measured pressure signal P2 representing the measured pressure PL of the low pressure line 64 to the controller 100.

The processing unit 110 detects feature points that periodically appear in the measured pressure (S11). For example, the processing unit 110 receives a first measured pressure signal P1 and detects a feature point that periodically appears in the measured pressure PH during the operation of the cryocooler 10. The detected feature point may represent an intake start timing of the rotary valve 42. Alternatively, the processing unit 110 may receive a second measured pressure signal P2 and detect a feature point that periodically appears in the measured pressure PL during the operation of the cryocooler 10. In this case, the detected feature point may represent the exhaust start timing of the rotary valve 42. Since the feature points detected in this way represent the phase of the refrigeration cycle, and the phase of the refrigeration cycle is associated with the rotation angle of the expander motor 40, the processing unit 110 can specify the motor rotation angle from the feature points.

The processing unit 110 acquires the motor drive waveform S from the storage unit 112 (S12). Here, the processing unit 110 may select one motor drive waveform S from a plurality of motor drive waveforms, and acquire the selected motor drive waveform S from the storage unit 112. As described above, the plurality of motor drive waveforms may include the first motor drive waveform and the second motor drive waveform. The processing unit 110 may determine the current operation mode of the cryocooler 10, select the first motor drive waveform in the case of initial cooling, and select the second motor drive waveform in the steady operation.

The processing unit 110 outputs the acquired motor drive waveform S to the motor drive unit 120 in synchronization with the detected feature point (S13). The processing unit 110 outputs the motor drive waveform S to the motor drive unit 120 by feed forward. The output motor drive waveform S corresponds to at least one refrigeration cycle starting at a detection time point of a feature point (for example, a time point of a detected intake start timing or an exhaust start timing). Therefore, the motor drive unit 120 receives the command rotation speed of the motor rotary shaft 40a that drives the motor rotary shaft 40a at least one rotation with the detection time point of the feature point as a start point.

The processing unit 110 may detect a feature point in each refrigeration cycle and output a motor drive waveform S corresponding to one refrigeration cycle to the motor drive unit 120 each time the feature point is detected. Alternatively, detection every time is not essential, and the processing unit 110 may detect a feature point each time the refrigeration cycle is performed in a plurality of cycles, and output a motor drive waveform S corresponding to the refrigeration cycle of the plurality of cycles to the motor drive unit 120.

Even in a case where the feature point is detected before the end of the previously output motor drive waveform S, the processing unit 110 may output the motor drive waveform S having the detection time point of the feature point as the start point to the motor drive unit 120. Alternatively, the processing unit 110 may consider the feature point detected before the end of the motor drive waveform S as erroneous detection and ignore the feature point.

In a case where it is assumed that a time delay occurs from the detection time point of the feature point to the output of the motor drive waveform, the processing unit 110 may output the motor drive waveform S corresponding to at least one refrigeration cycle having a reference time point in consideration of this delay as a start point, to the motor drive unit 120.

In a case where the feature point appearing periodically is not detected due to a failure of the pressure sensor or the like, the controller 100 may acquire and output a (third) motor drive waveform determined to make the command rotation speed of the motor rotary shaft 40*a* constant. In this case, the processing unit 110 may acquire the third motor drive waveform from the storage unit 112, and output the third motor drive waveform to the motor drive unit 120. In this way, even in a case where the feature point is not detected, the supply of the command rotation speed is not interrupted, so that the operation of the cryocooler 10 can be continued by continuing the rotation of the expander motor at a constant speed.

The motor drive unit 120 generates a motor drive current from the external power supply 80 according to the received motor drive waveform S, and supplies the motor drive current to the expander motor 40. In this way, the expander motor 40 rotates the motor rotary shaft 40*a* at the command rotation speed indicated by the motor drive waveform S. According to the motor drive waveform S, the motor rotary shaft 40*a* rotates while increasing or decreasing the rotation speed (or at a constant rotation speed) in one rotation. By the rotation of the expander motor 40, the cryocooler 10 causes a refrigeration cycle to provide cryogenic cooling.

According to the embodiment, the phase of the refrigeration cycle is specified based on the measured pressure, and the command rotation speed after the rotation angle of the expander motor 40 corresponding to the specified phase can be given to the expander motor 40 without impairing the real-time property.

Generally, a position detector such as an encoder is required to control the speed of the motor according to such a rotation angle. However, when such a position detector is added to the cryocooler 10, there may be an inconvenience such as an increase in the manufacturing cost of the cryocooler 10 and an increase in the size of the expander motor 40 due to the addition. On the other hand, since the cryocooler 10 is often provided with a pressure sensor such as a first pressure sensor 54 or a second pressure sensor 55, such an inconvenience does not occur.

In addition, in the embodiment, since the expander motor 40 is controlled by feed forward and is not controlled by feedback in real time, the risk of occurrence of a defect that may occur in the control such as oscillation is reduced, which is advantageous.

In the embodiment, since the command rotation speed can be prepared in advance so as to implement the optimum operation of the cryocooler 10, the optimum operation of the cryocooler 10 can be performed without detecting the position. For example, it is possible to switch and provide the optimum operation required for each of different operating conditions (for example, initial cooling and steady operation) of the cryocooler 10, depending on the condition.

It is not essential to switch the command rotation speed of the expander motor 40, depending on the operating conditions. In a certain embodiment, the cryocooler 10 may include: an expander motor 40 including a motor rotary shaft 40*a*; a displacer 18 that is connected to the motor rotary shaft 40*a* to reciprocate linearly by the rotation of the motor rotary shaft 40*a*, changes the volume of the expansion space of the working gas by the reciprocation, and passes through a top dead center where the volume of the expansion space is maximum within a first angle range in one rotation of the motor rotary shaft 40*a*, and passes through a midpoint between the top dead center and a bottom dead center where the volume of the expansion space is minimum within a second angle range following the first angle range in one rotation of the motor rotary shaft 40*a*; and a controller 100 that operates the expander motor 40 so as to decrease the rotation speed of the motor rotary shaft 40*a* in the second angle range as compared with the first angle range. The controller 100 may operate the expander motor 40 so as to reduce the rotation speed of the motor rotary shaft 40*a* in the second angle range as compared to the first angle range, at least during the initial cooling.

The controller 100 may operate the expander motor based on an output of a detector that detects a parameter related (convertible) to a rotation angle of the motor rotary shaft 40*a*. Such a detector may be, for example, a pressure sensor provided in the cryocooler 10, such as a first pressure sensor 54 and a second pressure sensor 55. Alternatively, the detector may be an encoder that detects a rotation angle of the expander motor 40. The detector may be a position sensor that measures the position of the displacer 18. The pressure control mechanism of the cryocooler 10 may not be a rotary valve, the high pressure valve 42*a* and the low pressure valve 42*b* may be individually controllable valves, and these valves may not be mechanically connected to the expander motor 40.

The above-described embodiment has been described as an example of a case where the cryocooler 10 is a two-stage GM cryocooler, but the present invention is not limited thereto. The cryocooler 10 may be a single-stage or multi-stage GM cryocooler, or may be another type of cryocooler in which a displacer is driven by an expander motor.

The present invention has been described above based on the examples. It will be understood by those skilled in the art that the present invention is not limited to the above embodiments, various design changes can be made, various modification examples are possible, and such modification examples are also within the scope of the present invention.

INDUSTRIAL APPLICABILITY

The present invention can be used in the field of a cryocooler and a method of operating the cryocooler.

It should be understood that the invention is not limited to the above-described embodiment, but may be modified into various forms on the basis of the spirit of the invention. Additionally, the modifications are included in the scope of the invention.

What is claimed is:
1. A cryocooler comprising:
    an expander provided with: (1) an expander motor having a motor rotary shaft, (2) a displacer connected to the motor rotary shaft to reciprocate linearly by rotation of the motor rotary shaft so as to change a volume of an expansion space of a working gas by the reciprocation, and (3) a rotary valve connected to the motor rotary shaft to be rotated by the rotation of the motor rotary shaft so as to control intake and exhaust of the working gas into the expansion space;
    a pressure sensor that measures a pressure of the working gas and outputs a measurement signal indicating the measured pressure; and a controller configured to:
receive the measurement signal;
detect a feature point appearing periodically in the measured pressure during an operation of the cryocooler;
acquire a motor drive waveform indicating a command rotation speed of the motor rotary shaft determined to vary within one rotation of the motor rotary shaft; and
output the motor drive waveform in synchronization with the feature point appearing periodically.

2. The cryocooler according to claim 1, wherein the controller is configured to:
acquire the motor drive waveform by selecting one motor drive waveform from a plurality of motor drive waveforms, and
output the selected motor drive waveform in synchronization with the feature point appearing periodically, and wherein
the plurality of motor drive waveforms indicates respective command rotation speeds of the motor rotary shaft each being determined to vary in a different manner within the one rotation of the motor rotary shaft.

3. The cryocooler according to claim 2, wherein the displacer is configured to:
pass through a top dead center where the volume of the expansion space is a maximum within a first angle range in the one rotation of the motor rotary shaft, and
pass through a midpoint between the top dead center and a bottom dead center where the volume of the expansion space is a minimum within a second angle range following the first angle range in the one rotation of the motor rotary shaft, and wherein
the plurality of motor drive waveforms includes a first motor drive waveform and a second motor drive waveform,
the first motor drive waveform is determined such that the command rotation speed of the motor rotary shaft decreases in the second angle range as compared with the first angle range, and
the second motor drive waveform is determined such that the command rotation speed of the motor rotary shaft increases in the second angle range as compared with the first angle range.

4. The cryocooler according to claim 3, wherein the controller is configured to:
select the first motor drive waveform for an initial cooling operation of cooling from an initial temperature to a cryogenic temperature, and
select the second motor drive waveform for a steady operation of maintaining the cryogenic temperature following the initial cooling operation.

5. The cryocooler according to claim 1, wherein the displacer is configured to:
pass through a top dead center where the volume of the expansion space is a maximum within a first angle range in the one rotation of the motor rotary shaft, and
pass through a midpoint between the top dead center and a bottom dead center where the volume of the expansion space is a minimum within a second angle range following the first angle range in the one rotation of the motor rotary shaft, and wherein
the motor drive waveform is determined such that the command rotation speed of the motor rotary shaft decreases in the second angle range as compared with the first angle range.

6. The cryocooler according to claim 1, wherein the controller is configured to acquire and output a motor drive waveform determined to keep the command rotation speed of the motor rotary shaft constant within the one rotation of the motor rotary shaft, in a case where the feature point appearing periodically is not detected.

7. The cryocooler according to claim 1, further comprising:
a compressor; and
a high pressure line that connects the compressor to the expander to supply the working gas with a high pressure from the compressor to the expander, wherein
the pressure sensor measures the pressure of the working gas on the high pressure line.

8. The cryocooler according to claim 7, wherein the feature point appearing periodically is a feature point appearing periodically in the measured pressure of the high pressure line due to intake of the working gas into the expansion space through the rotary valve.

9. The cryocooler according to claim 1, further comprising:
a compressor; and
a low pressure line that connects the compressor to the expander to recover the working gas with a low pressure from the expander to the compressor, wherein
the pressure sensor measures the pressure of the working gas on the low pressure line.

10. The cryocooler according to claim 9, wherein the feature point appearing periodically is a feature point appearing periodically in the measured pressure of the low pressure line due to exhaust of the working gas from the expansion space through the rotary valve.

11. A method of operating a cryocooler, the cryocooler including an expander provided with (1) an expander motor having a motor rotary shaft, (2) a displacer connected to the motor rotary shaft to reciprocate linearly by rotation of the motor rotary shaft so as to change a volume of an expansion space of a working gas by the reciprocation, and (3) a rotary valve connected to the motor rotary shaft to be rotated by the rotation of the motor rotary shaft so as to control intake and exhaust of the working gas into the expansion space, the method comprising:
measuring a pressure of the working gas;
detecting a feature point appearing periodically in the measured pressure during an operation of the cryocooler;
acquiring a motor drive waveform indicating a command rotation speed of the motor rotary shaft determined to vary within one rotation of the motor rotary shaft; and
outputting the motor drive waveform in synchronization with the feature point appearing periodically.

12. A cryocooler comprising:
an expander motor having a motor rotary shaft;
a displacer connected to the motor rotary shaft to reciprocate linearly by rotation of the motor rotary shaft so as to change a volume of an expansion space of a working gas by the reciprocation such that the displacer passes through a top dead center where the volume of the expansion space is a maximum within a first angle range in one rotation of the motor rotary shaft and passes through a midpoint between the top dead center and a bottom dead center where the volume of the expansion space is a minimum within a second angle range following the first angle range in the one rotation of the motor rotary shaft; and a controller configured to operate the expander motor to reduce a rotation speed of the motor rotary shaft in the second angle range as compared to the first angle range.

* * * * *